(12) United States Patent
Fructuoso et al.

(10) Patent No.: US 9,318,104 B1
(45) Date of Patent: *Apr. 19, 2016

(54) METHODS AND SYSTEMS FOR SHARING OF ADAPTED VOICE PROFILES

(71) Applicant: Google Inc., Mountain View, CA (US)

(72) Inventors: Javier Gonzalvo Fructuoso, London (GB); Johan Schalkwyk, Scarsdale, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/796,245

(22) Filed: Jul. 10, 2015

Related U.S. Application Data

(63) Continuation of application No. 13/872,401, filed on Apr. 29, 2013, now Pat. No. 9,117,451.

(60) Provisional application No. 61/767,235, filed on Feb. 20, 2013.

(51) Int. Cl.
   *G10L 17/00* (2013.01)
   *G10L 15/02* (2006.01)
   *G10L 13/00* (2006.01)

(52) U.S. Cl.
   CPC .............. *G10L 15/02* (2013.01); *G10L 13/00* (2013.01); *G10L 2015/025* (2013.01)

(58) Field of Classification Search
   CPC ........... G10L 17/00; G06F 17/30; H04N 7/18
   USPC .......... 704/249, 235, 244, 256.5, 270, 273, 9; 340/5.1; 348/143; 370/352; 455/41.2, 455/411, 412.1, 456.1; 705/14.52; 706/27; 709/227; 713/153; 715/764
   See application file for complete search history.

(56) References Cited

U.S. PATENT DOCUMENTS 6,263,311 B1 * 7/2001 Dildy ........................... 704/273
6,556,969 B1 * 4/2003 Assaleh et al. ............. 704/256.5

(Continued)

FOREIGN PATENT DOCUMENTS

EP     0901000 A2    3/1999
EP     1073036 A2    1/2001

(Continued)

OTHER PUBLICATIONS

International Search Report and Written Opinion of International Application No. PCT/US2014/011688 dated Apr. 29, 2014 (mailed May 9, 2014).

(Continued)

*Primary Examiner* — Michael Colucci
(74) *Attorney, Agent, or Firm* — McDonnell Boehnen Hulbert & Berghoff LLP

(57) ABSTRACT

Methods and systems for sharing of adapted voice profiles are provided. The method may comprise receiving, at a computing system, one or more speech samples, and the one or more speech samples may include a plurality of spoken utterances. The method may further comprise determining, at the computing system, a voice profile associated with a speaker of the plurality of spoken utterances, and including an adapted voice of the speaker. Still further, the method may comprise receiving, at the computing system, an authorization profile associated with the determined voice profile, and the authorization profile may include one or more user identifiers associated with one or more respective users. Yet still further, the method may comprise the computing system providing the voice profile to at least one computing device associated with the one or more respective users, based at least in part on the authorization profile.

20 Claims, 7 Drawing Sheets

(56) References Cited

U.S. PATENT DOCUMENTS

| | | |
|---|---|---|
| 6,691,089 B1 * | 2/2004 | Su et al. .................... 704/244 |
| 7,668,718 B2 * | 2/2010 | Kahn et al. .................. 704/270 |
| 7,720,681 B2 | 5/2010 | Milstein |
| 7,987,092 B2 | 7/2011 | Cabezas |
| 8,214,208 B2 | 7/2012 | Mallett |
| 8,600,751 B2 | 12/2013 | Kuppuswamy et al. |
| 8,909,515 B2 * | 12/2014 | O'Neil et al. .................. 704/9 |
| 2004/0009750 A1 * | 1/2004 | Beros et al. ................. 455/41.2 |
| 2004/0267527 A1 * | 12/2004 | Creamer et al. .............. 704/235 |
| 2006/0141990 A1 * | 6/2006 | Zak et al. .................. 455/412.1 |
| 2007/0078986 A1 * | 4/2007 | Ethier et al. ................. 709/227 |
| 2007/0101122 A1 * | 5/2007 | Guo ........................... 713/153 |
| 2008/0045234 A1 * | 2/2008 | Reed .......................... 455/456.1 |
| 2008/0100414 A1 * | 5/2008 | Diab et al. .................... 340/5.1 |
| 2010/0100439 A1 * | 4/2010 | Jutla et al. ................. 705/14.52 |
| 2010/0217600 A1 | 8/2010 | Lobzakov |
| 2011/0134910 A1 * | 6/2011 | Chao-Suren et al. ......... 370/352 |
| 2011/0141276 A1 * | 6/2011 | Borghei ....................... 348/143 |
| 2011/0143714 A1 * | 6/2011 | Keast et al. .................. 455/411 |
| 2011/0275348 A1 * | 11/2011 | Clark et al. .................. 455/411 |
| 2013/0073499 A1 * | 3/2013 | Izhikevich et al. ............ 706/27 |
| 2013/0132091 A1 * | 5/2013 | Skerpac ....................... 704/273 |
| 2013/0275894 A1 * | 10/2013 | Bell et al. ..................... 715/764 |
| 2013/0317827 A1 * | 11/2013 | Fu et al. ....................... 704/273 |
| 2014/0162598 A1 * | 6/2014 | Villa-Real ..................... 455/411 |

FOREIGN PATENT DOCUMENTS

| | | |
|---|---|---|
| EP | 1168297 A1 | 1/2002 |
| EP | 1703492 A1 | 9/2006 |
| GB | 2336974 A1 | 11/1999 |
| WO | 0211016 A2 | 2/2002 |
| WO | 2008132533 A1 | 11/2008 |

OTHER PUBLICATIONS

J. Yamagishi et al., "Thousands of voices for HMM-based speech synthesis," in Proc. Interspeech. Brighton, U.K., Sep. 2009, pp. 420-423.

Zen, H,: Braunschweiler, N.; Buchholz, S.; Gales, M.J.F.; Knill, K.; Krstulovic, S.; Latorre, J.;, "Statistical Parametric Speech Synthesis Based on Speaker and Language Factorization,," Audio, Speech, and Language Processing, IEEE Transactions on, vol. x, No. x, pp. 1-11, Jan. 2011.

* cited by examiner

METHODS AND SYSTEMS FOR SHARING OF ADAPTED VOICE PROFILES

CROSS-REFERENCE TO RELATED APPLICATION

The present application is a continuation of U.S. patent application Ser. No. 13/872,401, filed on Apr. 29, 2013, which claims priority to U.S. Provisional Application No. 61/767,235, filed on Feb. 20, 2013, both of which are herein incorporated by reference as if fully set forth in this description.

BACKGROUND

Computing systems such as personal computers, laptop computers, tablet computers, cellular phones, among many other types of computing systems, are increasingly prevalent in numerous aspects of modern life. As computers become progressively more integrated with users' everyday life, the convenience, efficiency, and intuitiveness of the user-interfaces by which users interact with computing devices becomes progressively more important.

"Cloud computing," in particular, refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or USB flash drive.

Moreover, cloud computing may also enable users to share personal files with other users that have their computing device(s) connected to the cloud as well. As an example, one user may initially have sole access to a particular file or group of files. The user may authorize (e.g., via file system permissions) another user, or group of users, to have the same (or limited) access to the particular file or group of files. The other user(s) may then view, edit, and/or share the particular file or group of files depending on the permissions given to them by the original user.

SUMMARY

In one aspect, a method is described. The method may comprise receiving, at a computing system, one or more speech samples, and the one or more speech samples include a plurality of spoken utterances. The method may further comprise determining, at the computing system, a voice profile associated with a speaker of the plurality of spoken utterances, and the voice profile includes an adapted voice of the speaker based on a personalization of a speech model to the one or more speech samples. Still further, the method may comprise receiving, at the computing system, an authorization profile associated with the determined voice profile, and the authorization profile includes one or more user identifiers associated with one or more respective users. Yet still further, the method may comprise, based at least in part on the authorization profile, the computing system providing the voice profile to at least one computing device associated with the one or more respective users.

In another aspect, a computer readable storage medium having stored therein instructions executable by a computing system to cause the computing system to perform functions is described. The functions may comprise receiving one or more speech samples that include a plurality of spoken utterances. The functions may further comprise determining a voice profile associated with a speaker of the plurality of spoken utterances, and the voice profile includes an adapted voice of the speaker based on a personalization of a speech model to the one or more speech samples. Still further, the functions may comprise receiving an authorization profile associated with the determined voice profile, and the authorization profile includes one or more user identifiers associated with one or more respective users. Yet still further, the functions may comprise, based at least in part on the authorization profile, providing the voice profile to at least one computing device associated with the one or more respective users.

In yet another aspect, a system is described. The system may comprise at least one processor. The system may also comprise data storage comprising instructions executable by the at least one processor to cause the system to perform functions. The functions may comprise receiving one or more speech samples, and the one or more speech samples include a plurality of spoken utterances. The functions may further comprise determining a voice profile associated with a speaker of the plurality of spoken utterances, and the voice profile includes an adapted voice of the speaker based on a personalization of a speech model to the one or more speech samples. Still further, the functions may comprise receiving an authorization profile associated with the determined voice profile, and the authorization profile includes one or more user identifiers associated with one or more respective users. Yet still further, the functions may comprise, based at least in part on the authorization profile, providing the voice profile to at least one computing device associated with the one or more respective users.

In still another aspect, a system may be provided that includes a means for receiving one or more speech samples, and the one or more speech samples include a plurality of spoken utterances. The system may further comprise a means for determining a voice profile associated with a speaker of the plurality of spoken utterances, and the voice profile includes an adapted voice of the speaker based on a personalization of a speech model to the one or more speech samples. Still further, the system may comprise a means for receiving an authorization profile associated with the determined voice profile, and the authorization profile includes one or more user identifiers associated with one or more respective users. Yet still further, the system may comprise, based at least in part on the authorization profile, a means for providing the voice profile to at least one computing device associated with the one or more respective users.

These as well as other aspects, advantages, and alternatives, will become apparent to those of ordinary skill in the art by reading the following detailed description, with reference where appropriate to the accompanying drawings.

DETAILED DESCRIPTION

Figure 1:
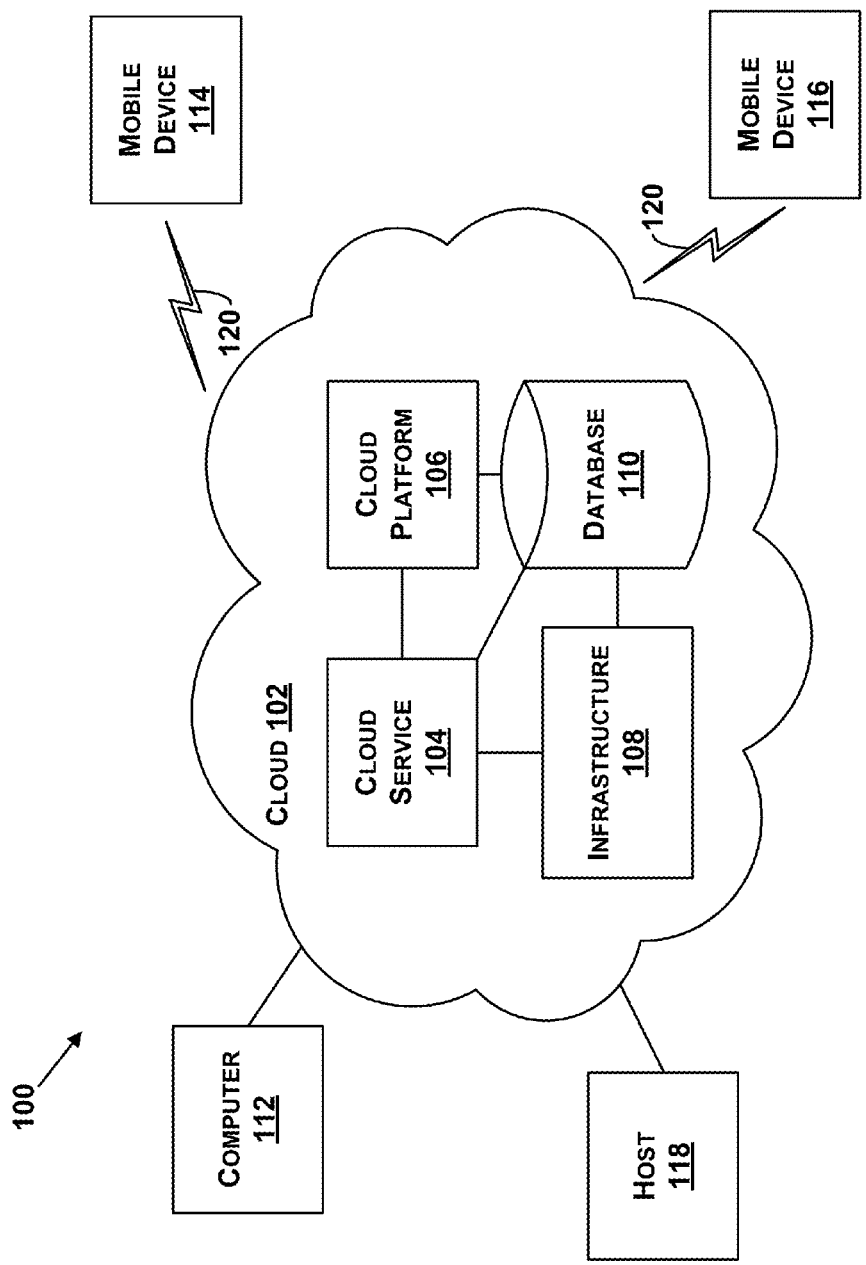
FIG. 1 illustrates an example system for cloud-based computing in which an example method may be implemented.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description may disclose, inter alia, systems and methods for sharing adapted voice profiles which may utilize cloud computing, in some examples. In one aspect, a system comprising at least one computing device and at least one client or mobile device may be configured to perform the methods described herein. The computing system may include one or more cloud-based computing devices configured to perform functions in accordance with the present methods. The client or mobile device(s) may include one or more mobile computing devices, such as a smartphone, tablet computer, laptop, and the like. The client device(s) can also include one or more non-mobile computing devices.

However, the functions that a "computing system," "computing device," a "mobile device," and a "client device" may be configured to perform may be performed, additionally or alternatively, by other devices. For example, such a device may include a desktop computer configured to run a voice-enabled application within a software application (e.g., an internet browser). Further, such a device may include a wearable device, such as a watch or glasses, a robot device, such as a computing device with electromechanical capabilities, or an appliance, such as a television, configured to receive voice inputs (e.g., via a microphone coupled to the device/appliance), produce voice outputs, and/or run voice-based applications, such as text-to-speech (TTS) synthesis applications.

In general, while "computing systems," "computing devices," "mobile devices," and "client devices" are referred to and described herein as examples, it should be understood that the systems and methods described herein may also be implemented with various types of computing devices including, but not limited to, the aforementioned computing devices. For example, the functions performed by a "computing system" as described herein, may be performed by one computing device or multiple computing devices. Further, functions performed by a "computing device" as described herein, may be performed, additionally or alternatively, by a mobile computing device, server, wearable computing device, computing appliance, etc. As another example, the functions performed by a "mobile device" or "client device" as described herein, may be performed, additionally or alternatively, by a desktop computer, wearable computing device, computing appliance, or other computing devices, both mobile devices and non-mobile devices. Further, functions described herein may be performed by one device or a combination of any devices described herein.

An example method may include receiving one or more speech samples. The speech samples may be representative of one or more verbal inputs, including a plurality of spoken utterances. For instance, a user of a mobile device may be prompted (e.g., by an application on the mobile device) to record speech samples, and the speech samples may be stored locally at the mobile device and/or provided to another computing device, such as a server or the cloud. Additionally, the method may include determining a voice profile. The voice profile may be associated with a speaker of the spoken utterances, such as the user of the mobile device or other device that the speech samples are recorded with. Further, the voice profile may include an adapted voice of the speaker. In some instances, the speech samples may be compiled by a computing device to generate a generic speech model. The speech model may then be personalized by the computing device or other device, such as a speaker adaptation server, so as to generate an adapted voice of the speaker. Personalization of the speech model may be based on unique characteristics of a given speaker's voice (e.g., frequencies, tempos, accents, etc.).

The method may also include receiving an authorization profile associated with the determined voice profile. The authorization profile may include one or more user identifiers associated with one or more respective users. For example, the determined voice profile may initially be associated with the speaker of the speech samples (e.g., the "owner" of the voice profile). Further, the speaker/user may provide user identifiers associated with one or more other users so as to authorize the one or more other users to access the voice profile (e.g., share the voice profile). As such, the method may further include providing the voice profile to at least one client device associated with the one or more other users. For example, user A may create a voice profile, specify user B in the authorization profile of the voice profile, and thereby share the voice profile with user B. By sharing the voice profile with user B, the voice profile may be provided by user A's mobile device or by another computing device (e.g., via a cloud-based computing system) to one or more computing devices associated with user B. As a similar example, user A's voice profile may be stored on the cloud, and user B may then access (e.g., download) the voice profile as long as user B is authorized to access the voice profile. It should be understood that "client device(s)" referred to herein may include one or more of the aforementioned computing devices, such as a mobile phone, personal computer, and the like.

Methods, systems, and devices in which example embodiments may be implemented will now be described in greater detail. In general, the described methods may be implemented by any computing device (or combination of computing devices) described herein, and/or those not described herein. An example system may take the form of computer readable medium, which has program instructions stored thereon that are executable by a processor to provide functionality described herein. Thus, an example system may take the form of a device such as a server, or a subsystem of such a device, which includes such a computer readable medium having such program instructions stored thereon.

Referring now to the figures, FIG. 1 illustrates an example system 100 for cloud-based computing in which an example method may be implemented. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In some scenarios, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

In other scenarios, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet computer, smartphone, etc.) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of such architecture may be transparent to users of client devices. For example, a mobile device accessing a cloud-based application may not be aware that the mobile device program logic and/or data from the server devices, or that the mobile device offloads processing or storage functions to the server devices.

In FIG. 1, the example system 100 includes a cloud 102, and the cloud 102 may include a cloud service 104, a cloud platform 106, a cloud infrastructure 108, and a database 110. The cloud 102 may include more or fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In other examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104.

The database 110 may represent storage capabilities by the cloud 102, and thus, may be accessed by any of the cloud service 104, the cloud platform 106, and/or the cloud infrastructure 108. With respect to the present methods, the database may include one or more of a speech samples database, an adapted voice database, a voice profile database, and the like.

The system 100 also includes a number of client devices coupled to or configured to be capable of communicating with components of the cloud 102. For example, a computer 112, a host 114, and mobile devices 114, 116 are shown coupled to the cloud 102. More or fewer client devices may be coupled to the cloud 102. In addition, different types of client devices may be coupled to the cloud 102. For example, any of the client devices may generally comprise a display system, memory, and a processor. Further, any one of the client devices may be configured to communicate with and share information with any other one or more of the client devices without the cloud acting as an interface between the respective client devices The computer 112 may be any type of computing device (e.g., personal computer, laptop computer, etc.), and the mobile devices 114, 116 may be any type of mobile computing device (e.g., laptop, smartphone, cellular telephone, etc.). The host 118 may be any type of computing device or transmitter including a laptop computer, a mobile telephone, etc., that is configured to transmit data to the cloud 102. Any of the client devices may include additional components, such as Global Positioning System (GPS) receivers, infrared sensors, optical sensors, biosensors, accelerometers, among others, for example.

In addition, any of the client devices may include an integrated user interface that allows a user to interact with the device. For example, one or more of the mobile devices 114, 116 may include various buttons and/or a touchscreen interface that allow a user to provide input. Further, a client device may include a microphone configured to receive voice commands from a user. Still further, a client device may include a voice-user-interface (VUI) (e.g., "voice control"), which may allow a user of the client device to provide speech data (e.g., record speech samples, provide voice commands, etc.) to the client device in order to recognize verbal inputs. The speech data may then translated into text and/or processed by a speech recognition system, and may ultimately be used by the client device as a basis for executing certain computing functions. Yet still further, a client device may include one or more applications executable by a processor of the client device and configured to perform TTS synthesis or other text/speech-based functions.

In FIG. 1, communication links between client devices and the cloud 102 may include wired connections, such as a serial or parallel bus. Communication links may also be wireless links, such as link 120, which may include short range wireless links, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA, LTE, or GSM protocol, an access point may be a base station in a cellular network that provides Internet connectivity via the cellular network. As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

Figure 2:
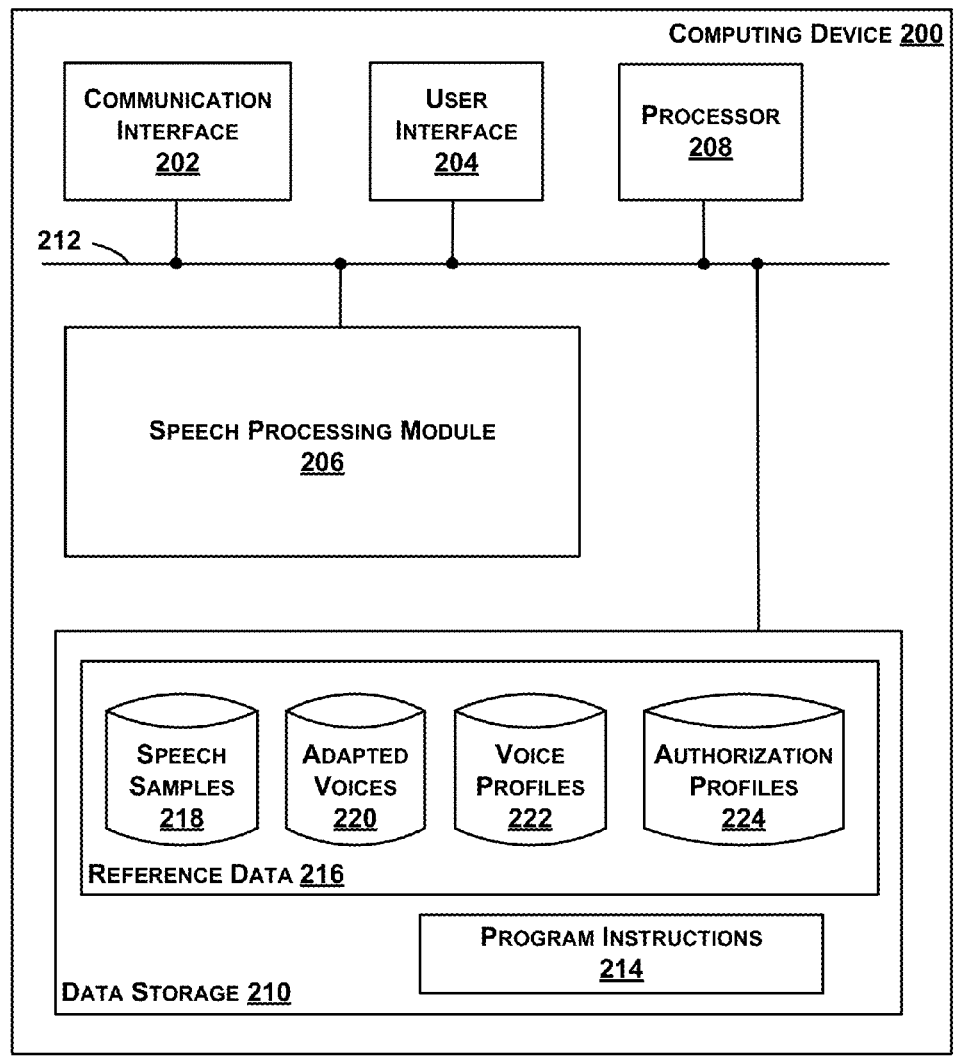
FIG. 2 illustrates a schematic drawing of an example computing device.

FIG. 2 illustrates a schematic drawing of an example computing device 200 configured to perform cloud-based computing. In some embodiments, some components illustrated in FIG. 2 may be distributed across multiple computing devices. However, for the sake of example, the components are shown and described as part of one example computing device 200. The computing device 200 may be a personal computer, mobile device, laptop computer, cloud, server, or similar entity that may be configured to perform the functions described herein.

The computing device 200 may include a communication interface 202, a user interface 204, a processor 206, a speech processing module 208, and data storage 210. All of the components illustrated in FIG. 2 may be linked together by a communication link 212. The computing device 200 may also include hardware to enable communication within the computing device 200 and between the computing device 200 and another computing device (not shown). The hardware may include transmitters, receivers, and antennas, for example.

The communication interface 202 may allow the computing device 200 to communicate with another device (not shown), such as a mobile phone, server, cloud, etc. Thus, the communication interface 202 may be configured to receive input data from one or more computing devices, and may also be configured to send output data to the one or more computing devices. In some examples, the communication interface 202 may also maintain and manage records of data received and sent by the computing device 200. In other examples, records of data may be maintained and managed by other components of the computing device 200.

The user interface 204 may include user input devices such as a keyboard, a keypad, a touchscreen, a wireless computer mouse, a joystick, and/or other similar devices, now known or later developed. The user interface 204 may also comprise user display devices, such as liquid crystal displays (LCD), light emitting diodes (LEDs), printers, and/or other similar devices, now known or later developed. In some embodiments, user interface 204 may include software, circuitry, or another form of logic that can transmit data to and/or receive data from external user input/output devices.

Additionally, the user interface 204 may include a VUI configured to receive verbal inputs (e.g., voice commands, speech samples) and to generate output data based on the received verbal inputs (e.g., via speech recognition). The VUI may include a microphone or similar device(s) for receiving the verbal inputs. The VUI may further include devices configured to generate audible outputs, such as a speaker, speaker jack, audio output port, audio output device, earphones, and/or other similar devices, now known or later developed. In some examples, the user interface 204 and the VUI may be configured to produce audible outputs based on non-verbal inputs (e.g., text entered via a keyboard or touchscreen). Additionally or alternatively, the user interface 204 and the VUI may be configured to produce non-verbal outputs (e.g., text displayed on a computer screen) based on verbal inputs.

With respect to the methods described herein, the computing device may receive data such as speech samples and authorization profiles from one or more client devices that the computing device is configured to communicate with (e.g., via the communication interface 202). Additionally or alternatively, the computing device may receive data directly via the user interface 204. In general, input data may be received directly by the computing device, indirectly from another computing device, or some combination thereof.

The speech adaptation module 206 may be configured to personalize a speech model based on one or more speech samples (or sets of speech samples) received by the computing device so as to determine one or more adapted voices. The speech adaptation module 206 may be further configured to perform one or more types of speech adaptation, such as cross-lingual adaptation. In addition, the speech adaptation module may include a speech recognition module (e.g., text recognition module), which may be configured to parse a received input (such as a verbal or textual input) and match the received input to a grammar-based/rule-based textual pattern. As such, the speech recognition module may be configured to perform functions based on received inputs (e.g., instructions comprising text or one or more spoken utterances).

The processor 208 may comprise one or more general purpose processors (e.g., microprocessors) and/or one or more special purpose processors (e.g., DSPs, GPUs, FPUs, network processors, or ASICs). The processor 208 may be capable of executing the program instructions 214 (e.g., compiled or non-compiled program logic and/or machine code) stored in data storage 210 to carry out the various functions described herein. The execution of the program instructions 214 by the processor 208 may result in the processor 208 referring to reference data 216 stored in data storage 210.

The data storage 210 may include one or more volatile and/or non-volatile storage components, such as magnetic, optical, flash, or organic storage, and may be integrated in whole or in part with processor 208. The data storage 210 may further include removable and/or non-removable components. Still further, the data storage 210 may include a non-transitory computer-readable medium, having stored thereon program instructions 214 that, upon execution by the computing device 200, cause the computing device 200 to carry out any of the methods, processes, or functions disclosed in this specification and/or the accompanying drawings.

The reference data 216 stored in the data storage 210 may include speech samples 218, adapted voices 220, voice profiles 222, and/or authorization profiles 224. For example, one or more speech samples stored in the reference data 216 may be accessed by the speech processing module 208. The speech processing module 208 may then determine a speech model and adapted voice(s) based on the speech samples.

The computing device 200 (e.g., the processor 208) may be configured to access the reference data 216 upon receiving an input from a user of the computing device 200 or an input from another computing device. In some examples, the computing device 200 may be included in the cloud, and the reference data 216 may serve as a database of the cloud. For instance, user A (and a client device associated with user A) may request access to a voice profile associated with user B. The computing device 200 may then access the reference data 216 and send/share the voice profile of user B to the client device of user A, provided that a user identifier for user A was included by user B in an authorization profile of the voice profile. In general, the computing device 200 may facilitate a sharing of voice profiles between one or more client devices that are each in communication with the computing device 200. It should be understood, however, that a client device (or client devices) may be configured to share voice profiles with another client device (or other client devices) without the intervention of an intermediate device (e.g., the computing device 200).

The communication link 212 is illustrated as a wired connection; however, wireless connections may also be used. For example, the communication link 212 may be a wired serial bus such as a universal serial bus or a parallel bus. A wired connection may be a proprietary connection as well. The communication link 212 may also be a wireless connection using Bluetooth radio technology, cellular technology (such as GSM, CDMA, UMTS, EV-DO, WiMAX, or LTE), or Zigbee® technology, among other possibilities. One or more remote computing devices may be accessible via the Internet and may include a computing cluster associated with a particular web service (e.g., social-networking, photo sharing, address book, etc.).

Figure 3:
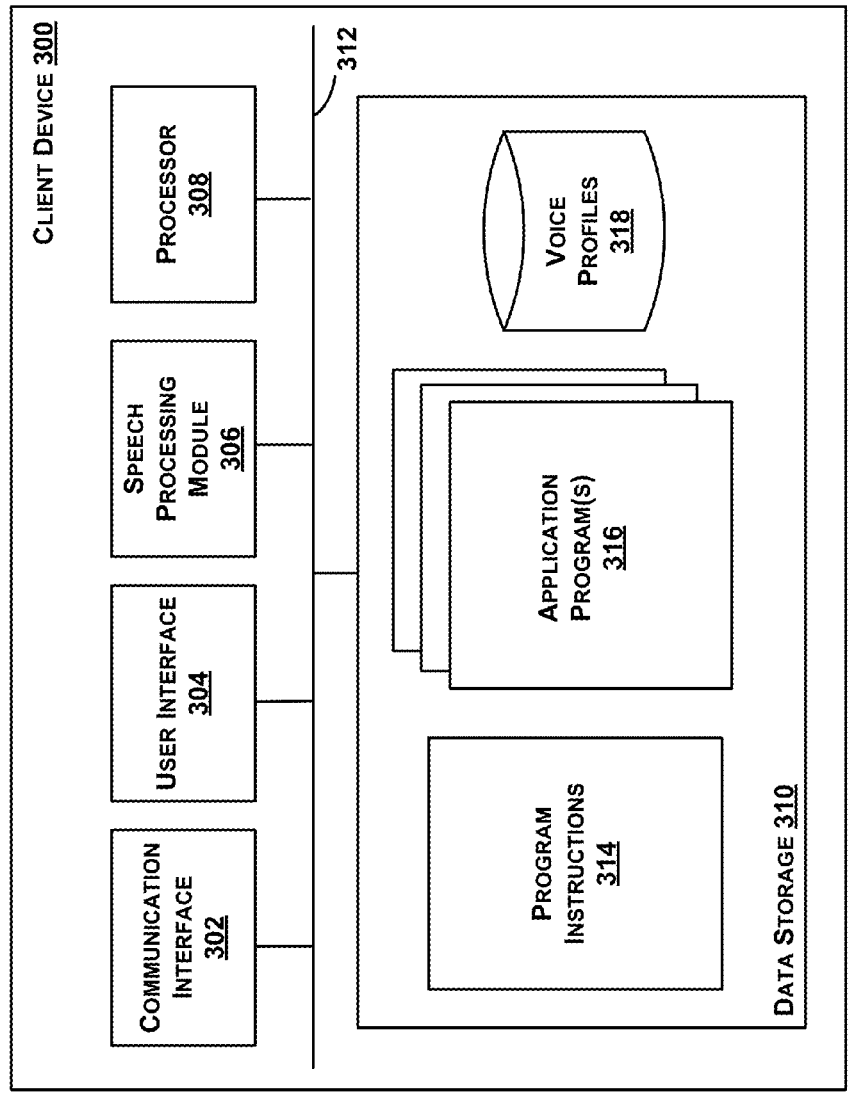
FIG. 3 illustrates a schematic drawing of an example client device.

FIG. 3 illustrates a schematic drawing of an example client device 300. In some examples, some components illustrated in FIG. 3 may be distributed across multiple computing devices. However, for the sake of example, the components are shown and described as part of one example client device 300. The client device 300 may be a smartphone, laptop computer, email/messaging device, tablet computer, personal computer, video camera, home appliance (e.g., television, toaster, etc.), wearable computing device, or some other type of device that may be configured to perform the functions described herein.

The client device 300 may include a communication interface 302, a user interface 304, a speech processing module 306, a processor 308, and data storage 310. All of the components illustrated in FIG. 3 may be linked together by a communication link 312. The client device 300 may also include hardware to enable communication within the client device 300 and between the client device 300 and one or more other computing devices (not shown), such as a server, a mobile device, and/or any computing device configured to perform cloud-based computing. The hardware may include transmitters, receivers, and antennas, for example. The communication link 312 may be configured similarly to the communication link as described in FIG. 2.

The communication interface 302 may allow the client device 300 to communicate with one or more other computing devices, such as the computing device 200 of FIG. 2. Thus, the communication interface 302 may be configured to receive input data from one or more computing devices, and may also be configured to send output data to the one or more computing devices. In some examples, the communication interface 302 may also maintain and manage records of data received and sent by the client device 300. In other examples, records of data may be maintained and managed by other components of the client device 300.

The user interface 304 may include user input devices such as a keyboard, a keypad, a touchscreen, a wireless computer mouse, a joystick, and/or other similar devices, now known or later developed. The user interface 304 may also comprise user display devices, such as liquid crystal displays (LCD), light emitting diodes (LEDs), printers, and/or other similar devices, now known or later developed. In some embodiments, user interface 304 may include software, circuitry, or another form of logic that can transmit data to and/or receive data from external user input/output devices.

Additionally, the user interface 304 may include a VUI configured to receive verbal inputs comprising one or more spoken utterances, and to generate output data based on the received verbal inputs. The VUI may include, possibly coupled to the client device 300, a microphone or similar device(s) for receiving the verbal inputs. The VUI may further include, also possibly coupled to the client device, one or more devices configured to generate audible outputs, such as a speaker, speaker jack, audio output port, audio output device, earphones, and/or other similar devices, now known or later developed. In some examples, the user interface 304 and the VUI may be configured to produce audible outputs based on non-verbal inputs (e.g., text entered via a keyboard or touchscreen). Additionally or alternatively, the user interface 304 and the VUI may be configured to produce non-verbal outputs (e.g., text displayed on a computer screen) based on verbal inputs. In general, the client device may receive input data directly via the user interface 304, such as one or more utterances spoken by a user of the client device.

The speech adaptation module 306 may be configured to personalize a speech model based on one or more speech samples (or sets of speech samples) received by the computing device so as to determine one or more adapted voices. The speech adaptation module 306 may be further configured to perform one or more types of speech adaptation. In addition, the speech adaptation module may include a speech recognition module (e.g., text recognition module), which may be configured to perform grammar-based and/or rule-based textual pattern recognition, among other functions.

The processor 308 may comprise one or more general purpose processors (e.g., microprocessors) and/or one or more special purpose processors (e.g., DSPs, GPUs, FPUs, network processors, or ASICs). The processor 306 may be capable of executing program instructions 314 (e.g., compiled or non-compiled program logic and/or machine code) stored in data storage 310 to carry out the various functions described herein. Therefore, the data storage 310 may include a non-transitory computer-readable medium, having stored thereon program instructions that, upon execution by the client device 300, cause the client device 300 to carry out any of the methods, processes, or functions disclosed in this specification and/or the accompanying drawings.

The data storage 310 may also include one or more application programs 316 (e.g., address book, email, web browsing, social networking, and/or gaming applications) installed on the client device 300. Data that is accessible to the application programs 316 may be arranged in a file system that is visible to or hidden from a user of client device 300. Further, the application programs 316 may be configured to communicate with an operating system of the client device 300 (not shown) through one or more application programming interfaces (APIs). These APIs may facilitate, for example, application programs 316 reading and/or writing application data

318, transmitting or receiving information via the communication interface 302, receiving or displaying information on the user interface/VUI 304, etc. Additionally, application programs 316 may be downloadable to the client device 300 through one or more online application stores or application markets. However, application programs can also be installed on client device 300 in other ways, such as via a web browser or through a physical interface (e.g., a USB port) on client device 300.

The data storage 310 may further include stored voice profiles 318. The voice profiles 318 may be accessible, for instance, by the application programs 316. As an example, the client device 300 may receive a shared voice profile from another client device and may subsequently store the voice profile in data storage 310. The voice profile (e.g., a copy of an original voice profile) may be initially stored in the cloud and then sent to the client device 300, or the voice profile may be sent directly from the other client device to the client device 300. The client device 300 may include an application program 316 configured to perform TTS synthesis using an adapted voice included as part of the voice profile. Further, an execution of certain functions of the TTS application program may cause the client device 300 to output audible representations of text in the form of a voice of a speaker associated with the other client device from which the voice profile was received.

As another example, user A may share a voice profile with the client device of user B (e.g., specify a user identifier for user B in the authorization profile of the voice profile), and user B may execute a particular TTS application program on the client device in accordance with the voice profile of user A. Further, the TTS application program may be an email application, and user B may send user A an email message comprising a plurality of text strings. The email application of the client device may then output an audio representation of the plurality of text strings, and the audio may or be identical to (or resemble) the voice of user B. Other examples of voice profile usage by a client device are also possible.

Figure 4:
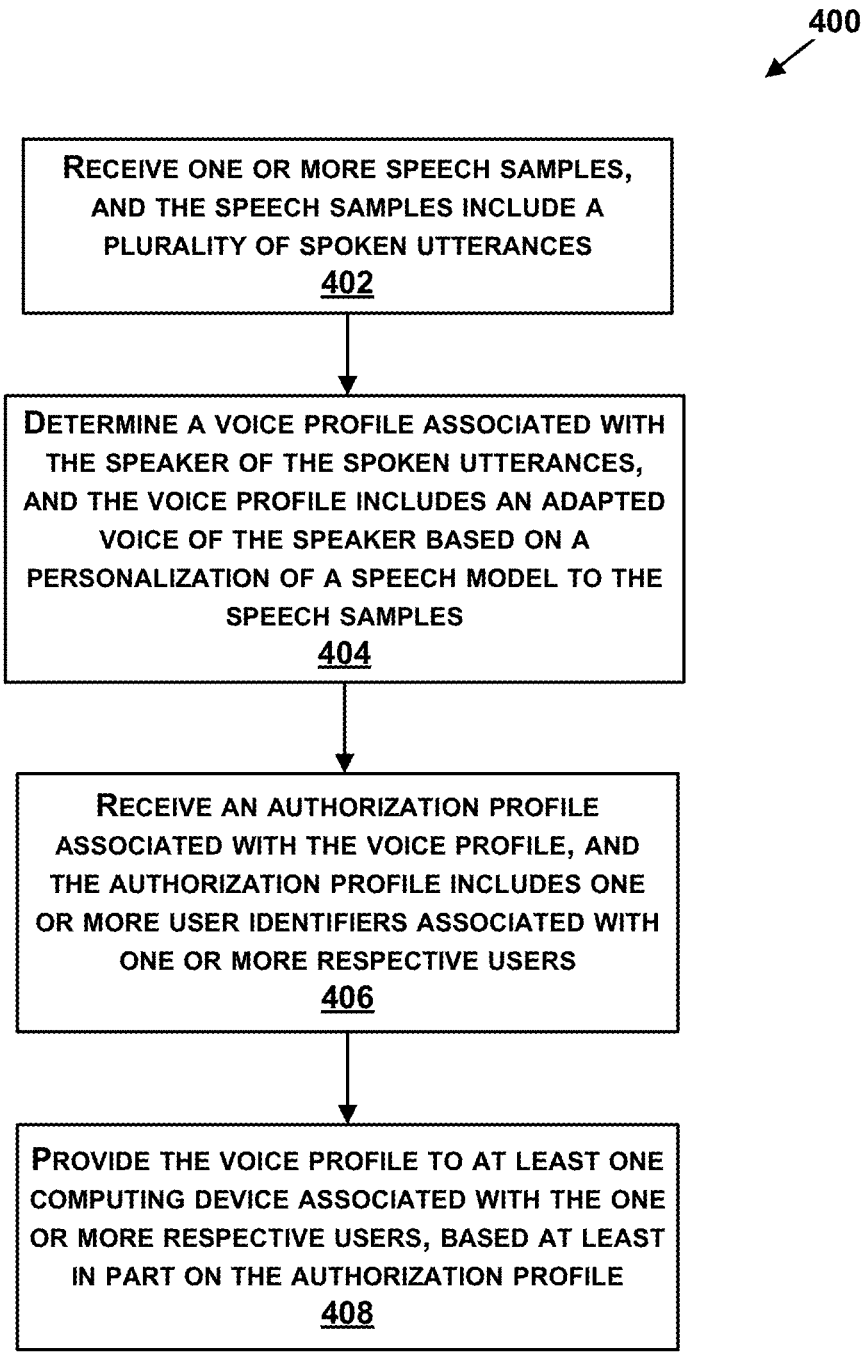
FIG. 4 depicts a flow chart of an example method.

FIG. 4 depicts a flow chart of an example method 400. Method 400 may include one or more operations, functions, or actions as illustrated by one or more of blocks 402-408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device.

For the sake of example, the method 400 shown in FIG. 4 will be described as implemented by an example computing system, such as the computing device 200 illustrated in FIG. 2. It should be understood, however, that other computing entities (both cloud-based and non-cloud-based) and combinations of such entities can implement one or more steps of the example method 400, such as the client device of FIG. 3.

Initially, at block 402, the method 400 includes receiving one or more speech samples, and the samples include a plurality of spoken utterances. The plurality of spoken utterances may be representative of a text string associated with the one or more speech samples. For example, the computing system may provide the text string (or text strings) to a user (e.g., a speaker of the spoken utterances) and the user may responsively provide a speech sample by speaking the text included in the text string. One or more speech samples may be associated with a given text string.

After receiving a first speech sample, the computing system may provide the same text string(s) or a different text string(s) to the user and receive subsequent speech samples comprising spoken utterances representative of the subsequently provided text string(s). The text strings may be provided to the user by a user interface of the computing system. Further, the text strings may be provided by an application program executable by the computing device, such as the application programs described in FIG. 3, and the application program may be an application program configured to enable the user to create/manage a voice profile.

In some examples, each speech sample may be received (e.g., recorded) by the computing system during a particular session, and each session may be associated with a respective session identifier. For example, one session may comprise the computing system providing a text string to the user to read aloud. As another example, a particular session may comprise the computing system providing a series of text strings to the user. The process of the computing system receiving one or more speech samples may comprise receiving multiple speech samples throughout multiple sessions. A particular session may be concluded once a given number of speech samples are received by the computing system. Each speech sample may be associated to a respective set of utterances, a respective text string (e.g., text prompt), and a respective session identifier.

During a particular session, or after a particular session is concluded, the computing system may prompt the user to (or provide an option to) record additional speech samples (e.g., a new session). Further, the computing system may also provide an option to the user for the user to delete previously recorded speech samples. Still further, the computing system may provide an option to the user for the user to edit recorded speech samples (e.g., adjust frequency, amplitude, pitch, etc.).

In addition to speech parameters, such as those relating to fundamental frequency, pitch, and prosody, a particular speech sample may include other speech characteristics. For example, the particular speech sample may be associated with a given language, such as English, French, Italian, Russian, and the like. As another example, the particular speech sample may be associated with a given emotion, such as happiness, sadness, and anger. Further, the particular speech sample may not be associated with an emotion (e.g., emotion-neutral and unexpressive). Other examples of speech characteristics are possible as well (e.g., gender). In such examples, a user may record the particular speech sample in a manner relating to one or more given speech characteristics (e.g., the user speaks in French, the user speaks with a happy tone of voice, etc.). In other examples, such speech characteristics (and/or parameters) of the speech samples may be managed after some or all of the speech samples have been received by the computing system.

The function of receiving the speech samples may be performed by a computing system that records audio (e.g., the spoken utterances). Alternatively, the computing may record the audio and communicate speech samples of the audio to another computing system, which can receive the speech samples and perform further processing.

At block 404, the method 400 includes determining a voice profile associated with the speaker of the spoken utterances, and the voice profile includes an adapted voice of the speaker. The adapted voice of the speaker is based on a personalization of a speech model to the one or more speech samples. For instance, the computing system may determine a generic speech model based on the one or more speech samples. The generic speech model may be personalized by the computing system based on unique characteristics of a given speaker's voice (e.g., temporal and/or spectral characteristics) so as to determine an adapted voice. In some examples, an adapted voice may be based on more than one speaker's voice (e.g., one or more speech samples received by the computing system from each speaker). Further, such an adapted voice including multiple speakers' voices may be based on at least one speech sample from a first speaker received during a first session and at least one speech sample from a second speaker received during a second session.

As one example, functions of block 404 may be performed a computing system may provide speech samples to a server, and the server may determine an appropriate voice profile and provide the voice profile to the computing system. Thus, the computing system may determine the voice profile by communicating with other computing devices, for example. The computing system itself may additionally or alternatively perform processing to determine the voice profile with or without communicating with other computing devices.

In general, an adapted voice may be determined by a method or combination of methods including automatic speech recognition (ASR), statistical adaptation (e.g., hidden Markov model (HMM)-based synthesis/adaptation), constrained multiple linear regression (CMLR)-based adaptation, cross-lingual voice adaptation (e.g., artificially determining a Japanese-speaking adapted voice for a non-Japanese speaker using a Japanese speaker's speech samples), and other methods known and not yet known. The adapted voice may be determined at the computing system or remotely at other computing devices, such as an adaptation server. The voice profile may also be determined at the computing system or remotely at another computing device.

Figure 5:
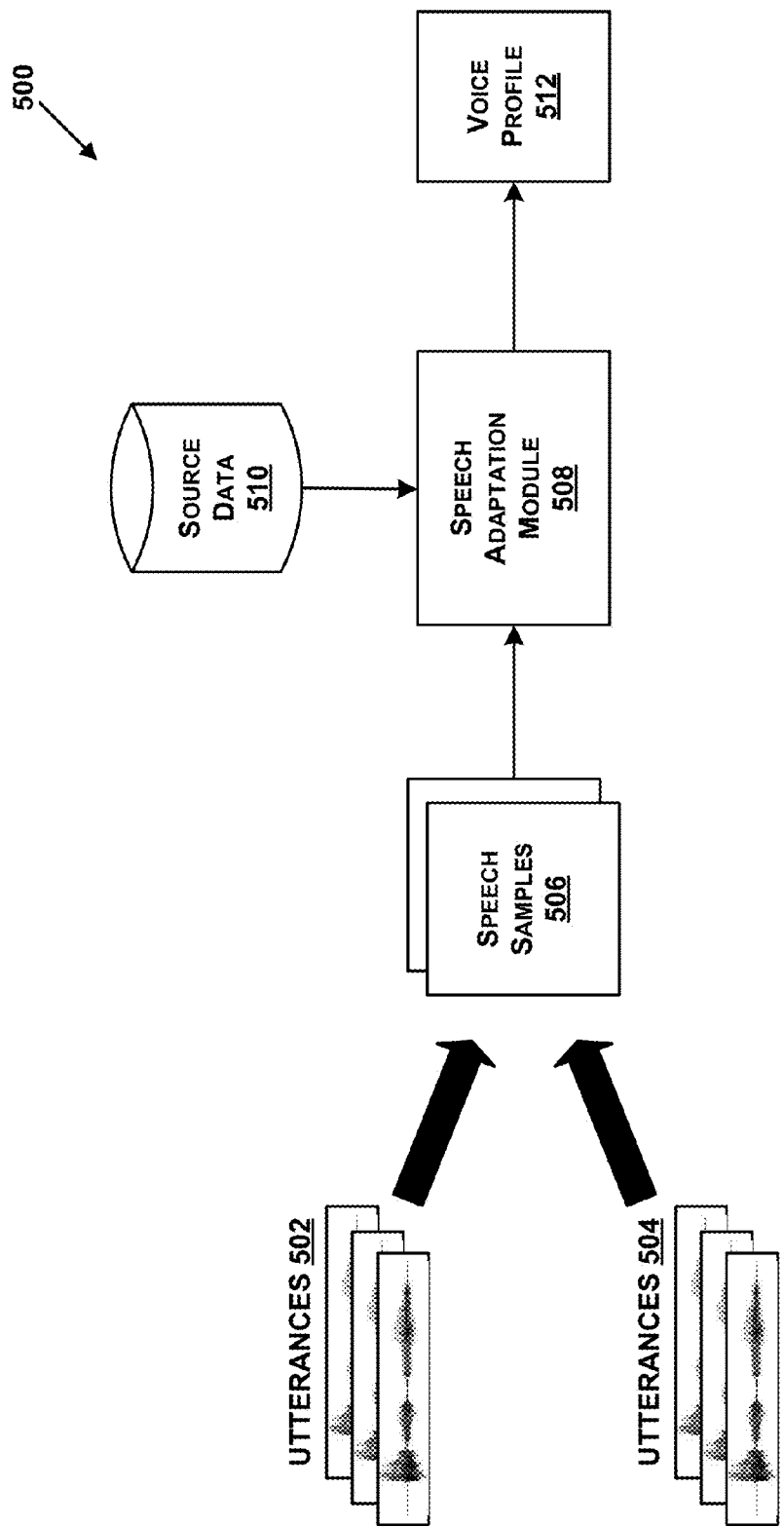
FIG. 5 illustrates an example system in accordance with an example method.

FIG. 5 illustrates an example system configured to determine a voice profile in accordance with the method 400 as described at block 404. As shown in FIG. 5, a first set of spoken utterances 502 (e.g., associated with a first text string) from a first speaker may be received by a computing system along with a second set of utterances 504 (e.g., associated with a second text string) from the first speaker and/or a different speaker. The spoken utterances 502, 504 may be included in one or more speech samples.

The speech samples 506 may be an input for a speech adaptation module 508, which may be configured to personalize one or more speech models of the speech samples 506 so as to determine an adapted voice for the speech samples 506. Further, the speech adaptation module may be configured similarly to or different than the speech adaptation module of FIGS. 2 and 3.

The speech adaptation module 508 may also be configured to access source data 510. The source data 510 may include, for example, speaker-independent training data (e.g., generic speech models such as "speaker-independent acoustic models") comprising hours of pre-existing speaker-independent speech samples/data. Further, the source data 510 may be used in accordance with a particular speech adaptation method, such as statistical/HMM speech adaptation, so as to determine the adapted voice. Personalization of generic speech models may be based at least in part on a rhythm of the spoken utterances, inflections of the spoken utterances, prosody of the spoken utterances, patterns of the spoken utterances, and the like. Lastly, the speech adaptation module 508, or other component(s) of the computing system, may determine the voice profile 512 including the adapted voice.

A voice profile may include multiple voice profiles associated with one or multiple speakers. Each voice profile, for example, may include a respective adapted voice associated with a respective speaker or speakers. Further, the respective adapted voice may be based on a personalization of a speech model to the speech samples received by the computing system during a given session or sessions identified by the session identifier(s). Still further, the respective adapted voice may be based on at least one respective adjustable parameter of a speech model, such as pitch, syllable duration, tone volume, overtone volume, rhythm, prosody, and the like. As such, multiple voice profiles may be determined, each associated with a respective adjustable parameter (e.g., a loud speaking voice, a slow-speaking voice, an accented voice, etc.). Additionally or alternatively, the respective adapted voice may be based on other characteristics such as language and emotion. As such, multiple voice profiles may be determined, each associated with a respective language and/or emotion (e.g., a happy Italian voice, a serious/formal English voice, etc.). In some examples, such parameters and/or characteristics may be managed by a user after the voice profile has been determined, such as by a speaker or another user with whom the voice profile is shared.

Figure 6A:
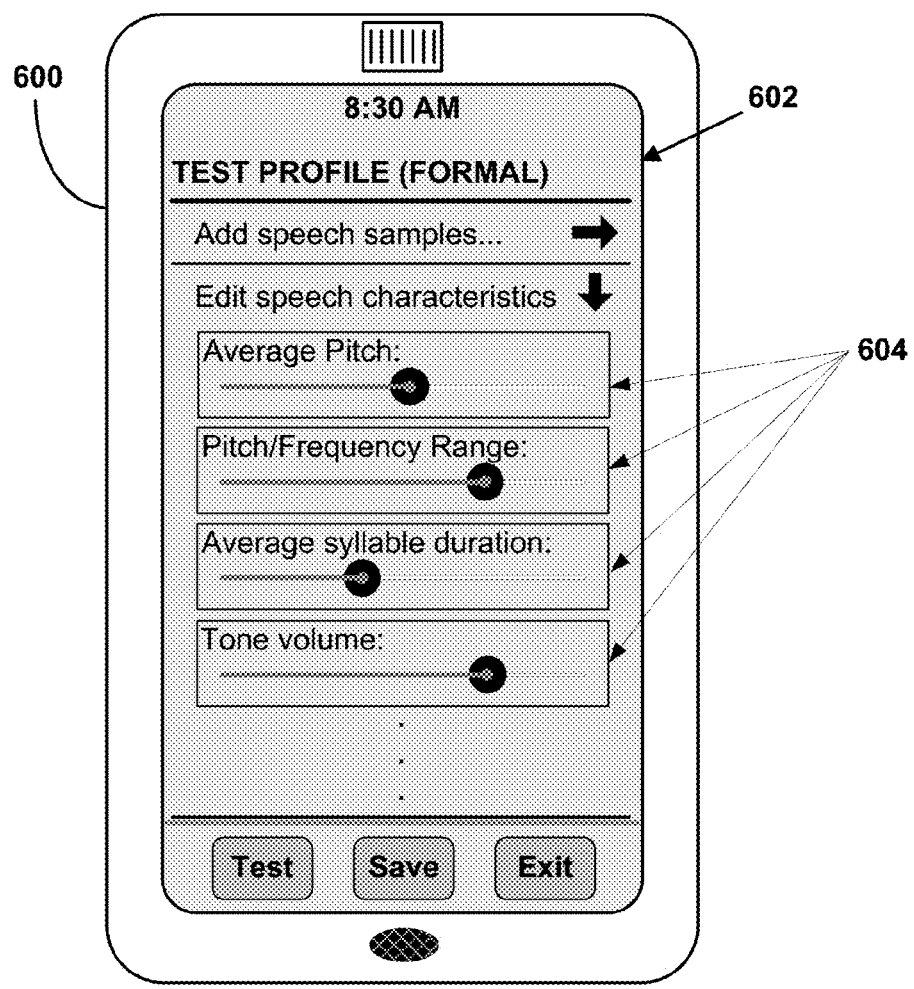
FIGS. 6A-6B illustrate an example client device configured to perform functions in accordance with an example method.

FIG. 6A illustrates an example computing device, such as a client device 600, configured to perform functions in accordance with the method 400. In particular, FIG. 6A illustrates a user interface 602 that may enable a user of the client device 600 to determine or generate a voice profile. The user interface 602, which may be provided by a particular application program of the client device 600, may include adjustable speech parameters/characteristics 604, such as parameters related to fundamental frequencies, prosody, and duration, which may be adjusted by the user after the user has recorded speech samples at the client device 600. As shown, each parameter 604 may be individually modified by a "slide bar" of the user interface 602. It should be understood that more, fewer, and/or different speech parameters/characteristics may be managed than those shown in FIG. 6A. Other speech data may be managed as well.

In general, a user interface such as the user interface 602 shown in FIG. 6A can be provided to the user to enable the user to review, update (e.g., save), delete, edit, and/or insert speech samples and speech parameters/characteristics 604 associated with the speech samples. Further, such speech parameters/characteristics 604 may be managed for each speech sample and/or a group of speech samples (e.g., a session of samples). Still further, such speech parameters/characteristics 604 may be managed after an adapted voice has been determined by the client device or other computing device.

Referring back to FIG. 4, at block 406, the method 400 includes receiving an authorization profile associated with the voice profile, and the authorization profile includes one or more user identifiers associated with one or more respective users. For example, user A may be the speaker/owner of the voice profile, may provide to the computing system a user identifier for user B and a user identifier for user C. By including the user identifiers for user B and user C, user A may enable/authorize user B and user C to access the voice profile of user A. As another example, user A may provide to the computing system one user identifier associated with both user B and user C. In general, a user identifier may be associated with one particular user, or a group of users, such as a contact list stored on a mobile phone (e.g., "Family," "Friends," and "Coworkers"), a name of a user, a telephone number of the user, etc. In other examples, a voice profile may be associated with specific devices or device identifiers as well.

In some examples, the voice profile may include a plurality of voice profiles, and a user may assign each voice profile to one or more user identifiers. As such, each voice profile may include a respective authorization profile. For instance, user A may determine two voice profiles: a first voice profile with an English-speaking adapted voice, and a second voice profile with a Spanish-speaking adapted voice. User A may then assign the first voice profile to one or more user identifiers associated with user B and user C, who may be English-speaking users, and assign the second voice profile to one or more user identifiers associated with user D and user E, who may be Spanish-speaking users. Each voice profile may be defined by one or more unique characteristics, such as language, accent, and emotion, and may be additionally or alternatively defined by parameters such as volume, frequency, duration, and the like.

Figure 6B:
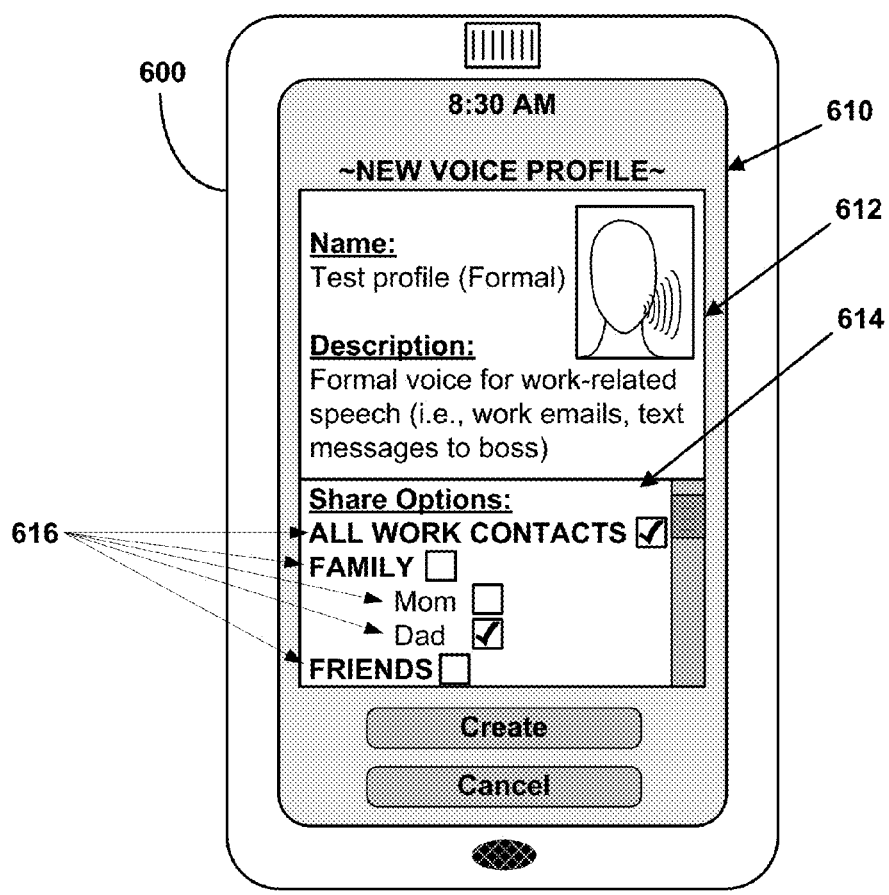

FIG. 6B illustrates another user interface 610 of the client device 600 of FIG. 6A, in accordance with the method 400. As shown, a user interface 610 of the client device 600 (e.g., a touchscreen of a smartphone) may enable a user of the client device 600 to view and create a voice profile 612. In the example shown, the user may identify the adapted voice as a "formal voice" based on the speech characteristics of the adapted voice. The user may also include a description of the adapted voice in the voice profile 604. In addition, the voice profile 612 may include an authorization profile 614 provided by the user, and the authorization profile 614 may include one or more user identifiers 616 (e.g., contacts on a phone) associated with one or more users with whom to share created voice profile 604. Other voice profile options are also possible.

Referring back to FIG. 4, at block 408, the method 400 includes providing the voice profile to at least one computing device, such as a client device, associated with the one or more respective users, based at least in part on the authorization profile. It should be understood, however, that the voice profile of a given user/speaker may not be automatically provided to other users responsive to determining the authorization profile. As an alternative, the authorization profile may enable the other users to access the voice profile of the given user, provided that the other users are identified in the authorization profile of the voice profile. Further, the other users may transmit a request to a server (or other computing device at which the voice profile is stored) and the server may then send the voice profile to the other users and/or enable the other users to download the voice profile from the server. As another alternative, a client device of the given user may directly share the voice profile with other client devices of other users without an intervention by a server or other computing device(s), either cloud-based or non-cloud-based. Other alternatives are also possible.

As an example of the method 400 at block 408, a first voice profile of user A may include a first adapted voice of user A (e.g., a happy voice), and may further include a user identifier for user B. Further, a second voice profile of user A may include a second adapted voice of user A (e.g., a sad voice), and may further include a user identifier for user C. In such an example, the computing system (e.g., a server or other computing device, such as a client device of user A) may then provide the first voice profile of user A to one or more client devices associated with user B, such as a smartphone, a laptop, and a personal computer all owned by user B. Additionally, the computing system may provide the second voice profile of user A to one or more client devices associated with user C, such as a smartphone, a laptop, and a personal computer all owned by user C. By receiving the voice profiles of user A, user B and/or user C may be permitted to modify and/or use the voice profiles of user A in various ways and for a variety of purposes.

A voice profile may include an application profile associated with the voice profile. The application profile may be received by the computing system and the application profile may include one or more application identifiers associated with one or more applications executable by the same or a different computing system/device. For instance, the application profile may be received by a cloud-based server from a client device or other computing device of a given user/speaker, and the application profile may then be provided, along with the voice profile, to at least one client device associated with other users identified in the authorization profile of the voice profile. The application profile may enable the other users to personalize one or more applications with the voice profile of the given user.

For example, a voice profile/application profile of user A may include application identifiers for an email application and a text message application, and both applications may be configured to perform TTS synthesis (e.g., convert the text strings included in an email or text message into speech). User A may share the voice profile with a client device of user B and the application profile may enable user B to personalize the email application and the text message application that are both executable by the client device of user B. For instance, upon receiving an email from user A, the client device of user B may convert the email text into speech, and the speech may be identical to an adapted voice of the voice profile. More specifically, the email may be read aloud by the client device of user B with the adapted voice determined by user A.

In other examples, a voice profile of a given user (e.g., user A) may not include an application profile. Further, a user that the voice profile is shared with (e.g., user B) may personalize one or more applications with an adapted voice of the voice profile. In still other examples, an adapted voice/voice profile may be associated with a given application based on one or more adjustable parameters and/or speech characteristics of the adapted voice. For instance, a formal adapted voice may be shared with a particular user. The formal adapted voice may have unique parameters, such as a particular tone, duration, and the like. As such, the formal adapted voice may be associated with a particular application executable by the client device of the particular user, and thus only the particular application may be authorized to personalize the application with the formal adapted voice. Other examples are also possible. Other uses for voice profiles as possible as well.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

We claim:

1. A method, comprising:
    receiving, at a computing system, an authorization profile associated with a voice profile that includes an adapted voice of a speaker based on a personalization of a speech model to one or more speech samples, wherein the one or more speech samples include a plurality of utterances spoken by the speaker, wherein the authorization profile identifies one or more respective other users whom are different from the speaker and authorized to use the voice profile on at least one other computing system associated with the one or more respective other users; and
    based at least in part on the authorization profile, the computing system providing the voice profile to the at least one other computing system associated with the one or more respective other users.

2. The method of claim 1, wherein the plurality of spoken utterances are representative of a text string associated with the one or more speech samples and provided to the speaker by the computing system.

3. The method of claim 2, wherein the computing system is a first computing system, and the method further comprising:
    receiving, at the first computing system, the one or more speech samples from a second computing system, wherein the second computing system is configured to receive an audio signal and convert the audio signal into the one or more speech samples; and
    wherein the text string is provided by a given application installed in memory on the first computing system, wherein the given application is configured to manage the voice profile.

4. The method of claim 1, wherein the personalization of the speech model is based at least in part on one or more of a rhythm, an inflection, and a pattern of the plurality of spoken utterances.

5. The method of claim 1, further comprising:
    before receiving the authorization profile:
        the computing system receiving the one or more speech samples; and
        based on the one or more speech samples, the computing system determining the voice profile associated with the speaker of the plurality of spoken utterances.

6. The method of claim 1, wherein each speech sample of the one or more speech samples is associated with a session identifier,
    wherein the session identifier is representative of a given session during which at least one of the one or more speech samples is received by the computing system,
    wherein the voice profile includes a plurality of voice profiles associated with a speaker of the plurality of spoken utterances, and
    wherein each respective voice profile of the plurality of voice profiles includes the session identifier and a respective distinct adapted voice of the speaker based on a personalization of a speech model to the one or more speech samples received by the computing system during the given session.

7. The method of claim 1, wherein the voice profile includes a plurality of voice profiles associated with a speaker of the plurality of spoken utterances, and the method further comprises assigning each respective voice profile of the plurality of voice profiles to one or more user profiles associated with one or more of the other users identified by the authorization profile.

8. The method of claim 7, wherein the computing system providing the voice profile to the at least one other computing system associated with the one or more respective other users comprises the computing system providing each of the plurality of voice profiles to a respective one or more other computing systems associated with the one or more respective other users.

9. A non-transitory computer readable medium having stored thereon instructions, that when executed by a computing system, cause the computing system to perform functions comprising:
    receiving an authorization profile associated with a voice profile that includes an adapted voice of a speaker based on a personalization of a speech model to one or more speech samples, wherein the one or more speech samples include a plurality of utterances spoken by the speaker, wherein the authorization profile identifies one or more respective other users whom are different from the speaker and authorized to use the voice profile on at least one other computing system associated with the one or more respective other users; and
    based at least in part on the authorization profile, providing the voice profile to the at least one other computing system associated with the one or more respective other users.

10. The non-transitory computer readable medium of claim 9, wherein the voice profile includes adjustable parameters, wherein the adjustable parameters include one or more of: a pitch of the speech model, a tone of the speech model, a volume of the speech model, and a rhythm of the speech model.

11. The non-transitory computer readable medium of claim 10, wherein the voice profile includes a plurality of voice profiles associated with a speaker of the plurality of spoken utterances, wherein each respective voice profile of the plurality of voice profiles is associated with a respective one or more parameters of the adjustable parameters.

12. The non-transitory computer readable medium of claim 9, wherein the voice profile includes a plurality of voice profiles associated with a speaker of the plurality of spoken utterances, and wherein each voice profile of the plurality of voice profiles includes a respective authorization profile, wherein each respective authorization profile identifies at least one other user who is different from the speaker and authorized to use the voice profile on at least one other computing system associated with the at least one other user.

13. The non-transitory computer readable medium of claim 12, wherein the functions further comprise:
    based at least in part on the respective authorization profile of each of the plurality of voice profiles, providing the plurality of voice profiles to a plurality of other computing systems, wherein each computing device of the plurality of other computing systems is associated with the at least one respective other user.

14. A system, comprising:
   at least one processor; and
   data storage comprising instructions executable by the at least one processor to cause the system to perform functions comprising:
   receiving an authorization profile associated with a voice profile that includes an adapted voice of a speaker based on a personalization of a speech model to one or more speech samples, wherein the one or more speech samples include a plurality of utterances spoken by the speaker, wherein the authorization profile identifies one or more respective other users whom are different from the speaker and authorized to use the voice profile on at least one other computing system associated with the one or more respective other users; and
   based at least in part on the authorization profile, providing the voice profile to the at least one other computing system associated with the one or more respective other users.

15. The system of claim 14, wherein the voice profile includes a speaker-independent voice based on the speech model of the one or more samples.

16. The system of claim 14, wherein the functions further comprise:
   receiving an application profile associated with the voice profile, wherein the application profile includes one or more application identifiers associated with one or more applications executable by the at least one other computing system, wherein the one or more applications are configured to utilize the voice profile.

17. The system of claim 16, wherein the one or more applications are configured to perform text-to-speech (TTS) synthesis so as to enable the at least one other computing system to produce sound, wherein the TTS synthesis is based at least in part on the voice profile.

18. The system of claim 14, wherein each speech sample of the one or more speech samples is associated with a session identifier, wherein the session identifier is representative of a given session during which at least one of the one or more speech samples is received by the system.

19. The system of claim 14, wherein the voice profile includes a plurality of voice profiles associated with a speaker of the plurality of spoken utterances, and wherein each voice profile of the plurality of voice profiles includes a respective authorization profile, wherein each respective authorization profile identifies at least one other user who is different from the speaker and authorized to use the voice profile on at least one other computing system associated with the at least one other user.

20. The system of claim 14, wherein the voice profile is a first voice profile, wherein the speaker is a first speaker, wherein the authorization profile is a first authorization profile, and wherein the functions further comprise:
   receiving (i) a second voice profile that includes an adapted voice of a second speaker based on a personalization of a speech model to one or more speech samples, wherein the one or more speech samples include a plurality of utterances spoken by the second speaker and (ii) a second authorization profile identifying a user associated to the system; and
   based on the second voice profile and further based on the second authorization profile identifying the user associated to the system, converting a string of text provided by the system into audio substantially representative of the adapted voice of the second speaker.

* * * * *